United States Patent

Merz

[11] Patent Number: 6,033,214
[45] Date of Patent: Mar. 7, 2000

[54] HEATING APPARATUS HAVING MULTIPLE HEATING CHAMBERS MOVABLE BETWEEN A FIRST POSITION WITH OPPOSED OPEN SIDES AND A SECOND POSITION WITH OPPOSED OPEN SIDES

[75] Inventor: Ulrich Merz, Gau-Odernheim, Germany

[73] Assignee: Bellaform Extrusionstechnik GmbH, Ingelheim, Germany

[21] Appl. No.: 09/097,032

[22] Filed: Jun. 12, 1998

[30] Foreign Application Priority Data

Jun. 27, 1997 [DE] Germany .............................. 297 11 193

[51] Int. Cl.[7] ....................................................... F24J 3/00
[52] U.S. Cl. .......................... 432/229; 432/120; 432/121; 432/202; 432/225
[58] Field of Search ..................................... 432/120, 124, 432/135, 209, 253, 162, 202, 225, 229, 231, 121, 261; 219/394, 404, 385, 389, 391; 264/405; 425/384

*Primary Examiner*—John A. Jeffery
*Assistant Examiner*—Jiping Lu
*Attorney, Agent, or Firm*—Hudak & Shunk Co., L.P.A.

[57] ABSTRACT

Described is a heating apparatus which in case of need guarantees nonproblematic access to the objects to be heated, without incurring heat losses. Used in conjunction with lip rolling apparatuses, the heating apparatus features at least two movably arranged heating boxes (1) and (2), which via parallelogram linkages connected in swingable fashion to a stationary support element (13), such that in their inoperative position they are away from the object to be heated and have assumed closed position as well.

8 Claims, 4 Drawing Sheets

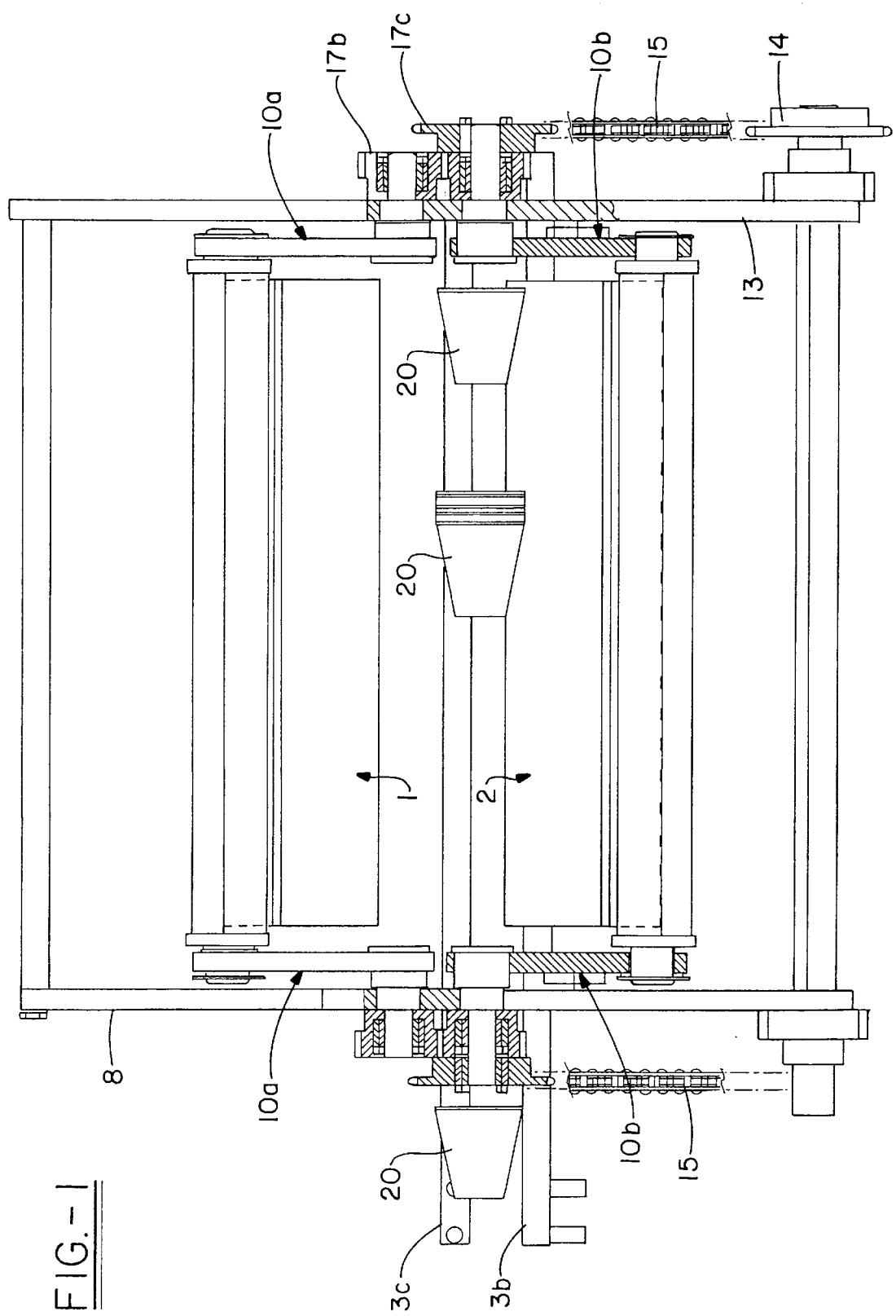

HEATING APPARATUS HAVING MULTIPLE HEATING CHAMBERS MOVABLE BETWEEN A FIRST POSITION WITH OPPOSED OPEN SIDES AND A SECOND POSITION WITH OPPOSED OPEN SIDES

FIELD OF INVENTION

The invention relates to a heating apparatus comprising at least two movably arranged heating boxes which in operating position extensively enclose (closed position) at least one object to be heated and which are movable to an inoperative position in which the object is accessible.

BACKGROUND OF THE INVENTION

Such heating apparatuses are used, e.g., in conjunction with lip rolling apparatuses in which blanked and deep-drawn plastic cups are provided with a rolled rim. To preheat the plastic cups to a specific prescribed temperature, they must pass through a heating section in which they are heated simultaneously on all sides. Consequently, the heating apparatus must be configured such that it encloses the cups. On the other hand, however, the cups also must be accessible if problems should arise in the cup transport through the heating apparatus and the cups must be removed from the heating apparatus manually. Multiple-part heating apparatuses allowing to be opened when needed suggest themselves for that purpose. Concerned in the simplest configuration are two heating boxes which enclose the object(s) to be heated and can be folded open for access to their interior.

In prior heating apparatuses, the heating boxes are merely moved apart, requiring the operating personnel to reach into the interior of the heating apparatus for removal of any jammed objects. Since the heating apparatus is mostly not turned off for such work, or is still hot, the operator may suffer burn wounds on the hot components.

A further disadvantage is constituted by the appreciable loss of energy that occurs when opening the heating apparatus. Once the heating apparatus is being closed again after repairs, it takes some time for the desired process temperature to restore.

The objective underlying the invention, therefore, is a heating apparatus which avoids the disadvantages of the prior art and guarantees, if needed, nonproblematic access to the objects to be heated, without incurring any heat losses. The foregoing objective is met by the provision of a heating apparatus which utilizes at least two heating chambers having open sides which face each other so as to close the chambers. The chambers are so arranged relative to each other in a first operating position and in a second inoperative position. The first and second positions are 180° apart (eg. front and back). The chambers are mounted so as to enable them to be swung in an arc in opposite directions from the first to second positions.

The design of the heating apparatus is such that the heating boxes are able to swing about, such that in their inoperative position away from the object they are in closed position as well. With the heating apparatus closed also in its inoperative position, no energy losses whatsoever occur during the operator's work. Besides, the heating apparatus is located then a specified distance from the object, so that the operating personnel will in such work make no contact at all with the heating apparatus.

The heating boxes are preferably of a superjacent arrangement, their open sides facing each other. Each heating box is on its two end walls preferably joined, in a fashion allowing swing movement, to a stationary support assembly by way of a parallelogram linkage. A parallelogram linkage offers the advantage that the heating boxes retain their position relative to each other when being swung, making it possible to move them, in their inoperative position, to a position corresponding to the working position. Both heating boxes move between inoperative and working position along a circular arc, with the top box swinging upward and the bottom box swinging down. The heating boxes can thereby transform from one closed position to another closed position. The heating boxes retract at the same time from the object being heated.

The support element features preferably a drive system which hinges to the points of articulation of the parallelogram linkage on the support assembly. Arranged in said points of articulation are preferably gears which are engaged by a cogged belt or a respective drive means connecting to a motor.

Exemplary embodiments of the invention are more fully described hereafter with the aid of the drawings, which show in:

BRIEF DESCRIPTION OF THE DRAWINGS

FIG. 1, a vertical section of a heating apparatus;

DETAILED DESCRIPTION OF THE INVENTION

FIG. 1 illustrates a side elevation of the heating apparatus, which in the depicted embodiment consists of two superjacent heating boxes 1 and 2. The heating apparatus is one that precedes a lip rolling apparatus. Plastic cups are pushed through the heating apparatus on the guide rods 3a, b and c. The configuration of the heating boxes 1 and 2 is such that they extensively enclose, in their operating position, the objects contained on the guide rods.

Figure 2A:
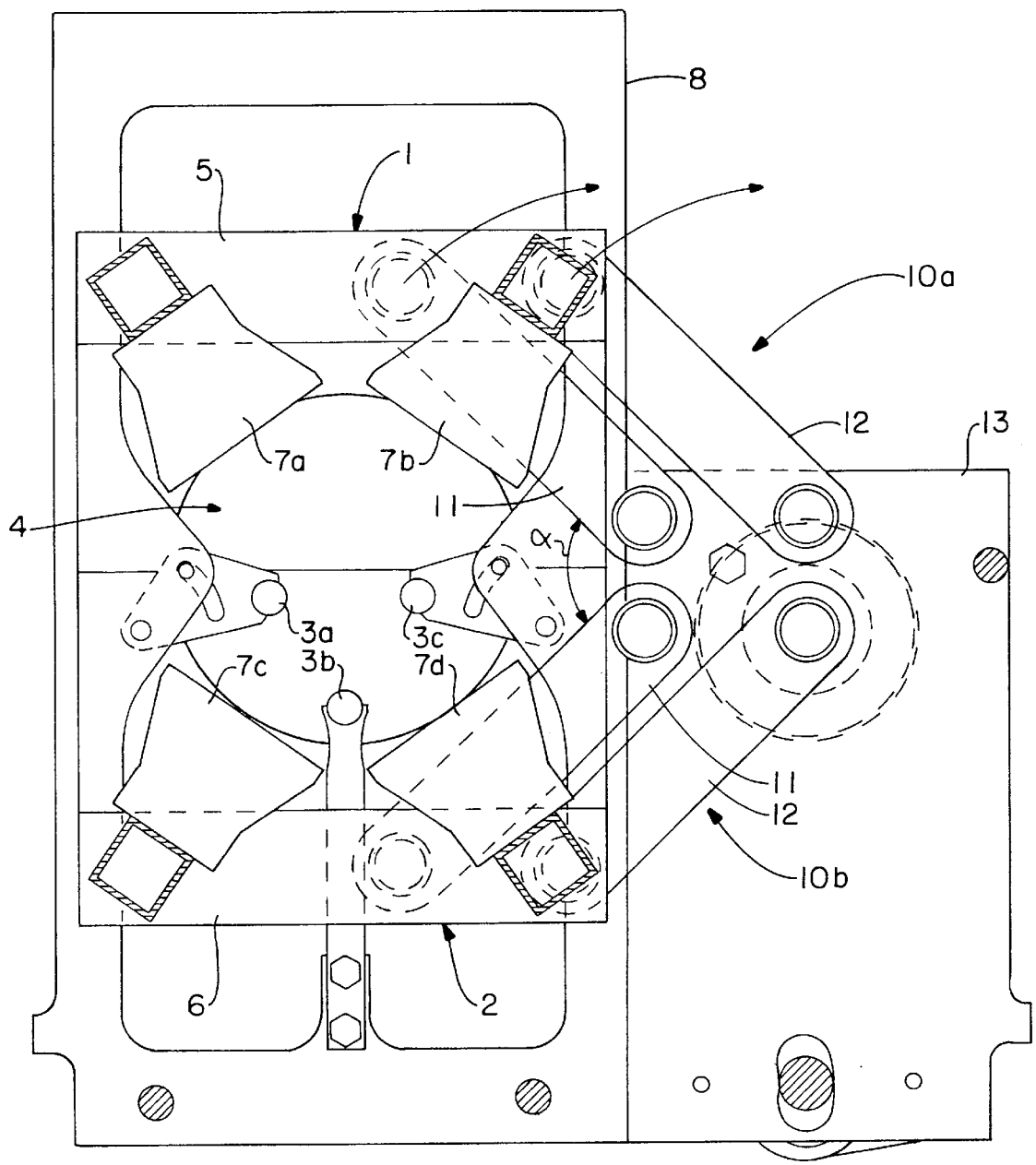
FIG. 2a, a plan view of the end face of the heating apparatus shown in FIG. 1, in working position.

FIG. 2a shows a plan view of one of the end faces of the heating boxes 1, 2 depicted in FIG. 1. The heating boxes 1 and 2 feature in their end walls 5 and 6 an opening 4 through which extend the guide rods 3a, b, c.

Arranged inside the heating boxes 1 and 2 are radiators 7a through d directed at the transport track formed by the guide rods 3a, b, c. Hinged to the end walls 5 and 6, outside, is a parallelogram linkage 10a, b each. Each parallelogram linkage consists of two equally long knuckle arms 11, 12, which are arranged on a support element 13 in swingable fashion. The knuckle arms of the two parallelogram linkages 10a, 10b form in the working position shown in FIG. 2a an acute angle α with each other.

Figure 2B:
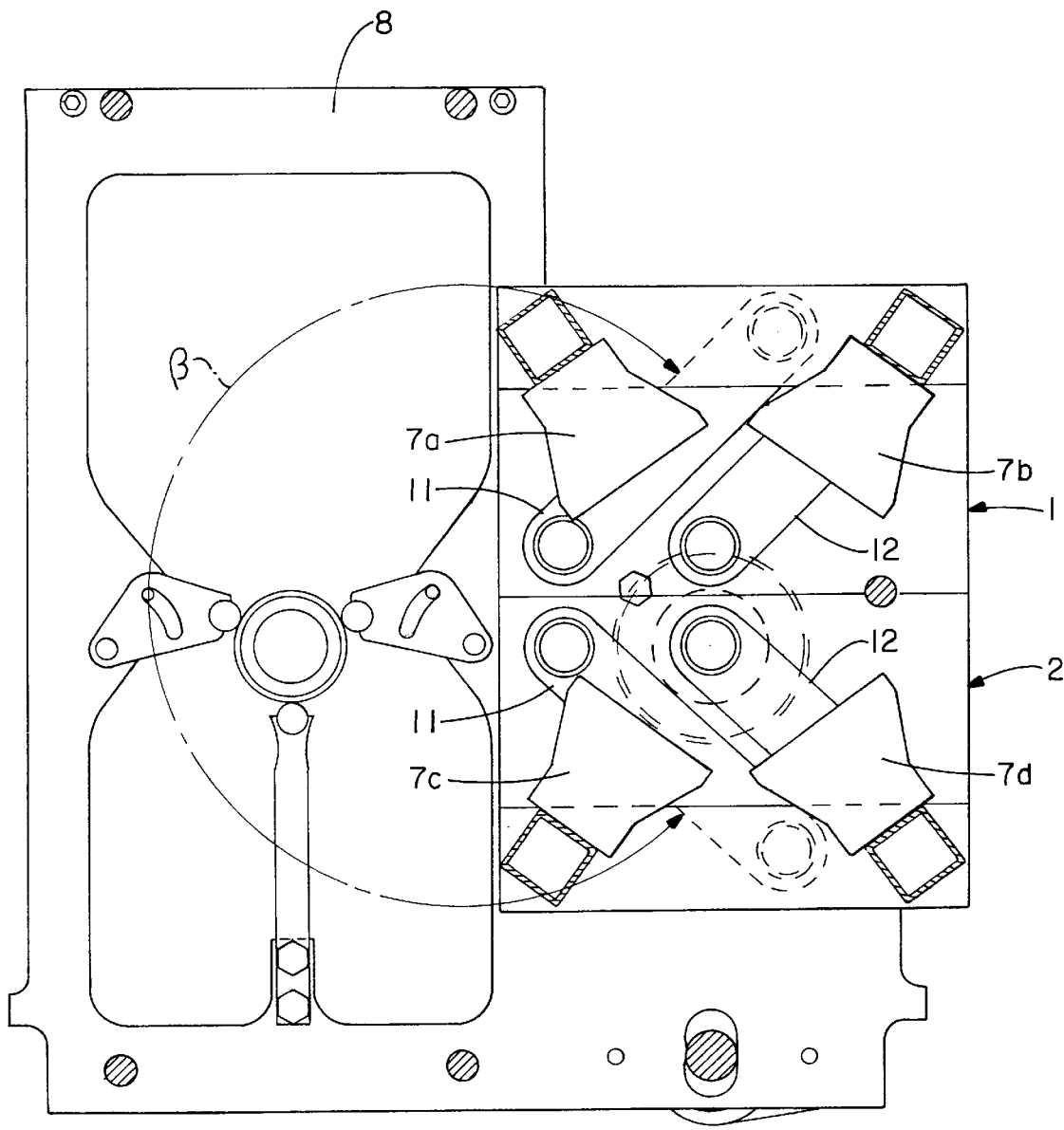
FIG. 2b, the heating apparatus relative to FIG. 2a in its inoperative position.

To open the heating boxes 1, 2, the parallelogram linkages 10a, 10b are swung in the direction of the arrow, causing the top heating box 1 to move upward along a circular track while the bottom heating box 2 swings down, as well along a circular track. At the end of the circular track, the two heating boxes 1 and 2 move together again, assuming the position shown in FIG. 2b. The angle α has continuously increased in this movement, until reaching the angle β in the limit position. Due to the parallelogram linkage 10a, b, the alignment of the two heating boxes 1 and 2 relative to each other is retained, so that in their inoperative position shown in FIG. 2b a closed position is reached again. The heat contained in the heating chambers 1 and 2 cannot escape while work is under way on the guide rods 3a–c.

Figure 3:
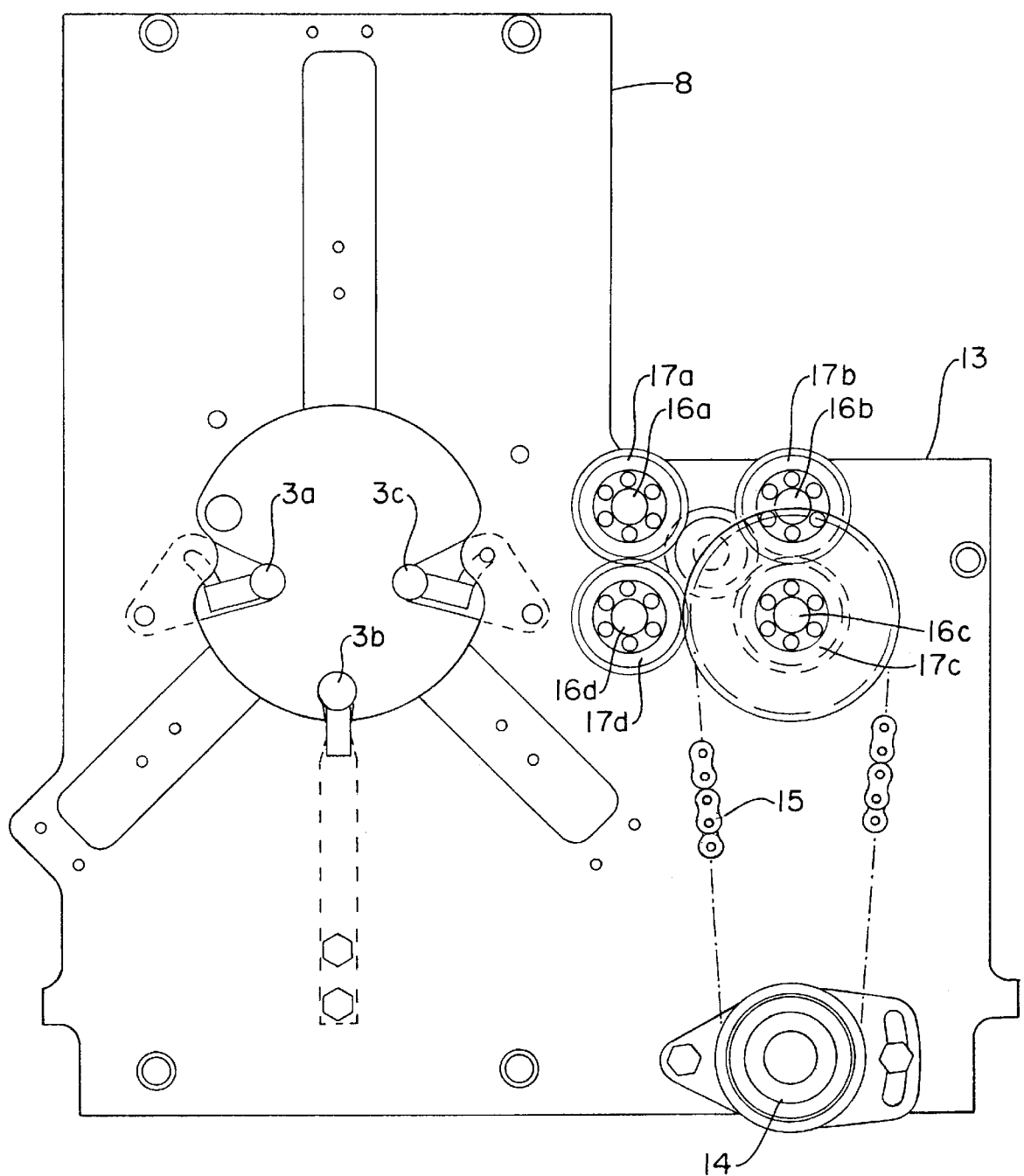
FIG. 3, a side elevation of the heating apparatus with pertaining drive system for swing movement of the heating boxes.

FIG. 3 illustrates a side elevation of the apparatus shown in FIG. 2a, along with the drive system, the heating boxes being covered by the housing 8. Arranged at the hinge points 16a through d of the two parallelogram linkages 10a, b, which are not visible in FIG. 3, are gears 17a through d, connected for rotation to the respective knuckle arms 11 and 12. One of the gears, 17b, connects by way of the drive chain 15 to the motor 14 (refer also to FIG. 1).

I claim:

1. A heating apparatus comprising:
    a support means for supporting an object to be heated;
    a first heating chamber comprising an enclosure defining a first heating recess and having a first heating chamber opening joined to said recess;
    a second heating chamber comprising an enclosure defining a second heating recess and having a second heating chamber opening joined to said recess;
    a heat source within said first and said second chambers;
    a stationary support assembly;
    first mounting means securing said first heating chamber to said stationary support assembly for swinging movement between an operative position and an inoperative position; and
    second mounting means securing said second heating chamber to said stationary support assembly for swinging movement between an operative position and an inoperative position;
    where said support means supports said object in said heating chambers only in said operative position and further in both an operative position and an inoperative position, the first heating chamber opening is opposing and adjacent the second heating chamber opening to thereby enclose the first such that said heat source is capable of heat said object on said support means only in the operative position.

2. A heating apparatus as set forth in claim 1, wherein said first and said second mounting means each comprise a parallelogram linkage.

3. A heating apparatus as set forth in claim 1, wherein said first heating chamber enclosure has an open side which defines said first heating chamber opening and wherein said second heating chamber enclosure has an open side which defines said second heating chamber opening.

4. A heating apparatus as set forth in claim 3, wherein said first heating chamber enclosure includes a first end wall which opposes said open side and the first end wall is supported on said stationary support by a parallelogram linkage and said second heating chamber includes a second end wall which opposes said open side and the second end wall is supported on said stationary support by a parallelogram linkage.

5. A heating apparatus as set forth in claim 4, wherein said first heating recess is located above said second heating recess in said operative position and said inoperative position.

6. A heating apparatus as set forth in claim 1, wherein a drive means is used to swing the operative and inoperative heating chambers from the first position to the second position.

7. A heating apparatus as set forth in claim 6, wherein first mounting means includes at least a first arm having a hinge which joins it to the stationary support and the second mounting means includes at least a second arm having a hinge which joins it to the stationary support and the drive means activates the first arm and the second arms to rotate at said hinges.

8. A heating apparatus as set forth in claim 7, wherein the drive means includes drive gears operatively joined to the hinges of the first and the second arms.

* * * * *